United States Patent [19]

Takahashi et al.

[11] Patent Number: 5,295,749
[45] Date of Patent: Mar. 22, 1994

[54] SPHERICAL ROLLER BEARING

[75] Inventors: Katsuyoshi Takahashi; Hisao Funakoshi; Takehiro Adachi, all of Osaka, Japan

[73] Assignee: Koyo Seiko Co., Ltd., Osaka, Japan

[21] Appl. No.: 944,942

[22] Filed: Sep. 15, 1992

[30] Foreign Application Priority Data

Sep. 20, 1991 [JP] Japan .................... 3-75884[U]

[51] Int. Cl.$^5$ .............................................. F16C 33/46
[52] U.S. Cl. .................................... 384/568; 384/576; 384/580
[58] Field of Search .............. 384/568, 580, 576, 572, 384/571, 526

[56] References Cited

U.S. PATENT DOCUMENTS

| | | | |
|---|---|---|---|
| 2,705,176 | 3/1955 | Palmgren | 384/580 |
| 2,969,267 | 1/1961 | Göthberg | 384/580 |
| 4,472,006 | 9/1984 | Göransson | 384/576 |
| 4,629,339 | 12/1986 | Morinaga | 384/576 |
| 4,702,627 | 10/1987 | Pollastro | 384/576 |
| 5,033,878 | 7/1991 | Tsuji | 384/576 |

FOREIGN PATENT DOCUMENTS 2-88023  7/1990  Japan ....................... 33/46

*Primary Examiner*—Lenard A. Footland
*Attorney, Agent, or Firm*—Mason, Fenwick & Lawrence

[57] ABSTRACT

A double-row spherical roller bearing comprises an inner race, an outer race, two retainers each molded of a synthetic resin, and double-rows of spherical rollers rotatably received in pockets of the retainers and arranged one after another in the equally spaced relationship in the circumferential direction. Each retainer is molded such that an annular portion on the large diameter side and an annular portion on the small diameter side are integrally jointed to each other with a plurality of retainer bars bridges therebetween. Each retainer bar comprises an inner portion located on the inner race side and an outer portion on the outer race side. Each side surface of the inner portion is defined by a part of the spherical surface extending around the spherical surface of each spherical roller. In addition, each side surface of the outer portion is defined by a first surface, a second surface and a third surface. A wedge-shaped gap is formed between the third surface and the spherical roller on the outer portion side so as to allow lubricant to easily penetrate into the spherical roller bearing therethrough. Additionally, a gap between the side surfaces at the opposite ends of the outer portion and the spherical roller is increasingly widened on the outer portion side. The arrangement of the gaps in that way makes it easy to form a lubricant film in the spherical roller bearing.

6 Claims, 3 Drawing Sheets

SPHERICAL ROLLER BEARING

BACKGROUND OF THE INVENTION

The present invention relates generally to a double-row spherical roller bearing including retainers each molded of a synthetic resin. More particularly, the present invention relates to improvement of a double-row spherical roller bearing of the foregoing type.

To facilitate understanding of the present invention, a typical conventional double-row spherical roller bearing including retainers each molded of a synthetic resin will be described below with reference to FIG. 4 and FIG. 5.

FIG. 4 is a fragmentary sectional view of the conventional double-row spherical roller bearing. As shown in the drawing, the spherical roller bearing includes as essential components an inner race 51, an outer race 52, double-rows of spherical rollers 53 located between the inner race 51 and the outer race 52 arranged in the equally spaced relationship in the circumferential direction, and two retainers 55 each molded of a synthetic resin to hold the spherical rollers 53 therein.

As is best seen in FIG. 5, each retainer 55 is constructed such that an annular portion 56 on the large diameter side and an annular portion 57 on the small diameter side are integrally jointed to each other with a plurality of retainer bars 58 each bridged therebetween. With this construction, each spherical roller 53 is rotatably received in a pocket 60 which is defined by both the annular portions 56 and 57 and adjacent retainer bars 58.

A side surface 58A of each retainer bar 58 is formed by a part of the spherical surface extending around the outer peripheral surface of each spherical roller 53. In addition, side surfaces 59A, 59B and 59C of each projection 59 projecting from the retainer bar 58 to come in contact with the spherical roller 53 are likewise formed by a spherical surface corresponding to the peripheral surface of the spherical roller 53. As the spherical roller 53 rolls, it comes in contact with the projection 59 at two points located on the opposite sides of the side surface 59B as seen in the axial direction, whereby disengagement of the spherical roller 53 from the pocket 60 is reliably prevented.

With the conventional double-row spherical roller bearing constructed as described above, each of the side surfaces 59A, 59B and 59C on the projection 59 projecting from the central part of each retainer bar 58 is formed as part of the spherical surface coinciding with the spherical surface of each spherical roller 53. Thus, there arise problems that lubricant hardly penetrates through the gap between the projection 59 and the spherical roller 53, and moreover, it is technically difficult to fabricate a molding die for molding retainers 55 using a synthetic resin.

In addition, the side surface 58A of each retainer bar 58 is formed as part of the three-dimensional curved surface coinciding with the spherical surface of each spherical roller 53 while extending from the end part on the opposite sides of the projection 59 of the inner race 51 side to the end part on the opposite sides of the same on the outer race 52 side, causing a part of the spherical surface of the spherical roller 53 to be closed with the aforementioned end parts on the opposite sides of the projection 59. Thus, there arises another problem that lubricant hardly penetrates through the gap between the side surface 58A of the retainer bar 58 and the spherical surface of the spherical roller 53, resulting in a lubricant film being formed with difficulty.

Further, since the side surface 58A of the retainer bar 58 is formed as a part of the three-dimensional curved surface, it is practically difficult to remove a molded product of each retainer 55 from the molding die for molding retainers 55 using a synthetic resin after completion of each molding operation.

SUMMARY OF THE INVENTION

The present invention has been made in consideration of the foregoing background.

An object of the present invention is to provide a double-row spherical roller bearing including retainers each molded of a synthetic resin wherein the spherical roller bearing can easily be produced at a reduced cost.

Another object of the present invention is to provide a double-row spherical roller bearing including retainers each molded of a synthetic resin wherein a lubricant film can easily be formed between each spherical roller and the corresponding retainer bar.

According to the present invention, there is provided a double-row spherical roller bearing wherein it comprises an inner race; an outer race; two retainers each molded of a synthetic resin, each of the retainers being located between the inner race and the outer race and integrally molded such that an annular portion on the large diameter side and an annular portion on the small diameter side are integrally jointed to each other with a plurality of retainer bars bridged therebetween so as to form a plurality of pockets each defined by the annular portion on the large diameter side, the annular portion on the small diameter side and adjacent retainer bars; each of the retainer bars for the retainers comprising an inner portion located on the inner race side relative to a second phantom plane extending through the center of each spherical roller at a right angle relative to a first phantom plane extending through the center axis of the spherical roller bearing and the center of each spherical roller and an outer portion located on the outer race side relative to the second phantom plane; the side surface of the inner portion facing the corresponding pocket being defined by a part of the spherical surface extending around the spherical roller; the central part of the side surface of the outer portion facing the corresponding pocket as seen in the axial direction being defined by a first surface merging into the spherical surface of the inner portion, a second surface extending from the first surface on the outer race side and a third surface extending from the second surface on the outer race side, the first surface being formed by a part of the cylindrical surface extending around the spherical surface on the inner portion side while extending in the axial direction, the center axis of the cylindrical surface extending in parallel with the first phantom plane, the second surface tilting toward the spherical roller side and coming in point contact with the spherical roller as it rolls, and the third surface extending in parallel with the first phantom plane; the side surfaces facing the corresponding pocket at the opposite ends of the outer portion exclusive of the central part of the spherical roller bearing as seen in the axial direction being defined by a part of the cylindrical surface defining the first surface; and double-rows of spherical rollers rotatably received in the pockets and arranged in the equally spaced relationship in the circumferential direction.

The first surface is formed by an arched surface having a predetermined radius of curvature while it is defined by a part of the cylindrical surface extending in parallel with the first phantom plane.

The second surface extends in parallel with a line segment which extends from a first intersection where the second phantom plane intersects the peripheral surface of the spherical roller to a second intersection where an extension from the outer peripheral surface of the retainer intersects the peripheral surface of the spherical roller.

With such construction, a wedge-shaped gap is formed between the third surface and the spherical roller on the outer portion side. Consequently, lubricant can easily penetrate into the spherical roller bearing through the wedge-shaped gap.

As the spherical roller rolls, it comes in point contact with the second surface. This reliably prevents the spherical roller from being disengaged from the pocket.

In addition, the gap between the side surfaces and the spherical roller on the outer portion side is increasingly widened in the radial direction. Thus, lubricant can easily penetrate into the spherical roller bearing through the foregoing gap, whereby a lubricant film can easily be formed in the spherical roller bearing.

Further, since the side surface of the inner portion facing the pocket as well as the side surfaces facing the pocket at the opposite ends of the outer portion exclusive of the central part of the spherical roller bearing as seen in the axial direction are defined by a part of the cylindrical surface, respectively, a molding die for molding retainers using a synthetic resin can easily be fabricated at a reduced cost. Moreover, a molded product of retainer can easily be removed from the molding die after completion of each molding operation.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to FIG. 1 and FIG. 2 which illustrate a double-row spherical roller bearing in accordance with a preferred embodiment of the present invention.

Figure 1:
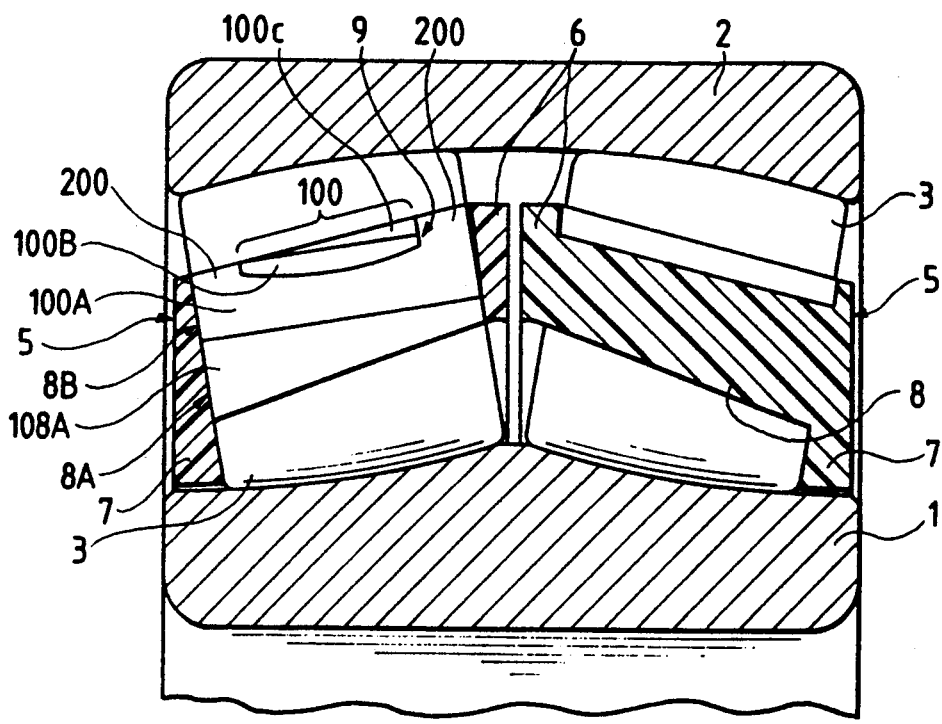
FIG. 1 is a fragmentary sectional view of a double-row spherical roller bearing in accordance with an embodiment of the present invention.

As shown in FIG. 1, the spherical roller bearing includes as essential components an inner race 1, an outer race 2, two retainers 5 each molded of a synthetic resin and interposed between the inner race 1 and the outer race 2, and double-rows of spherical rollers 3 arranged one after another in the equally spaced relationship in the circumferential direction.

Figure 2:
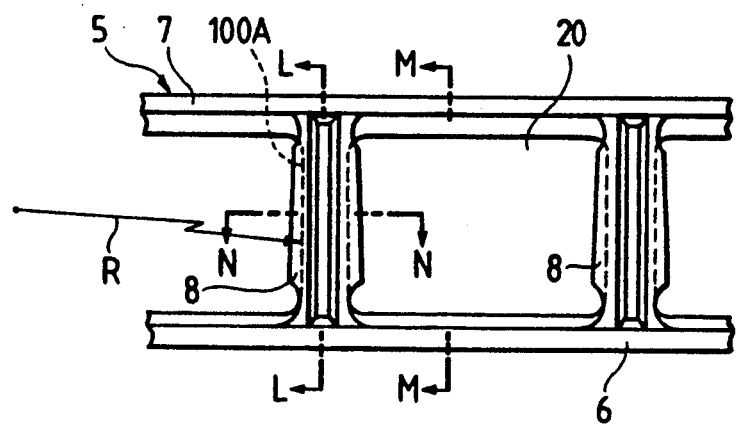
FIG. 2 is a fragmentary plan view of a retainer for the spherical roller bearing shown in FIG. 1.

The right half of FIG. 1 is a fragmentary sectional view of the right-hand retainer 5 taken along line L—L in FIG. 2, and the left half of the same is a fragmentary sectional view of the left-hand retainer 5 taken along M—M in FIG. 2.

Each retainer 5 is constructed such that an annular portion 6 on the large diameter side and an annular portion 7 on the small diameter side are integrally jointed to each other with a plurality of retainer bars 8 bridged therebetween. It should be added that both the annular portions 6 and 7 and the retainer bars 8 are integrally molded of a synthetic resin. A pocket 20 is formed by both the annular portions 6 and 7 and adjacent retainer bars 8, and each spherical roller 3 is rotatably received in the pocket 20.

Figure 3:
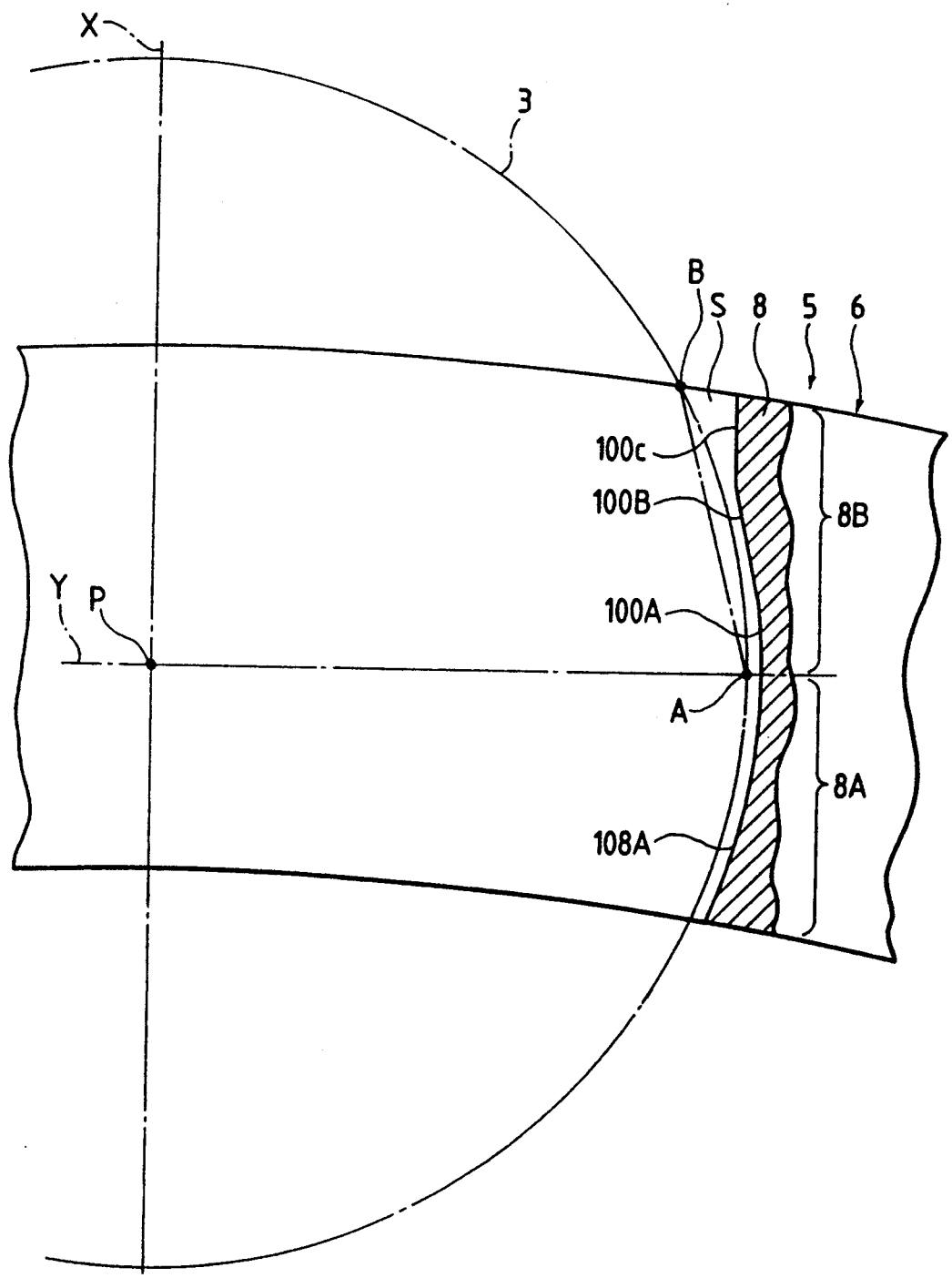
FIG. 3 is a fragmentary enlarged cross-sectional view of the retainer shown in FIG. 2, particularly illustrating the structure of a retainer bar extending transversely relative to the retainer.
Figure 4:
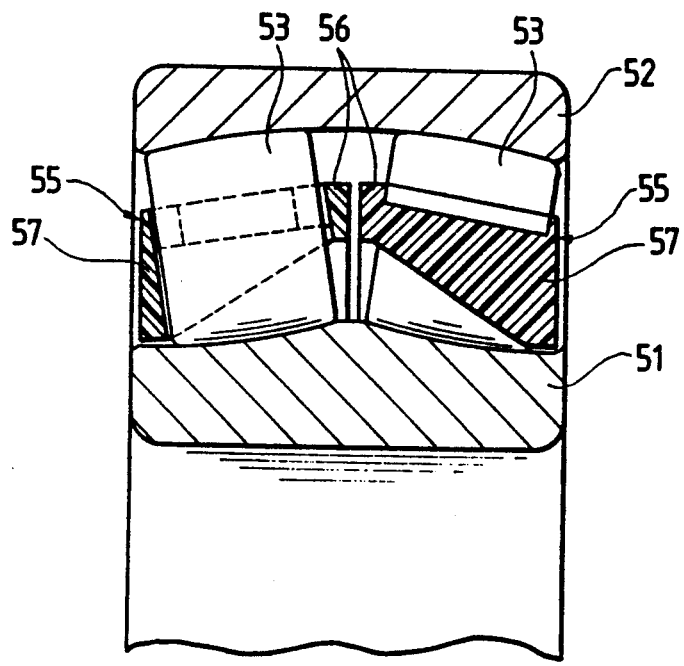
FIG. 4 is a fragmentary sectional view of a conventional double-row spherical roller bearing.
Figure 5:
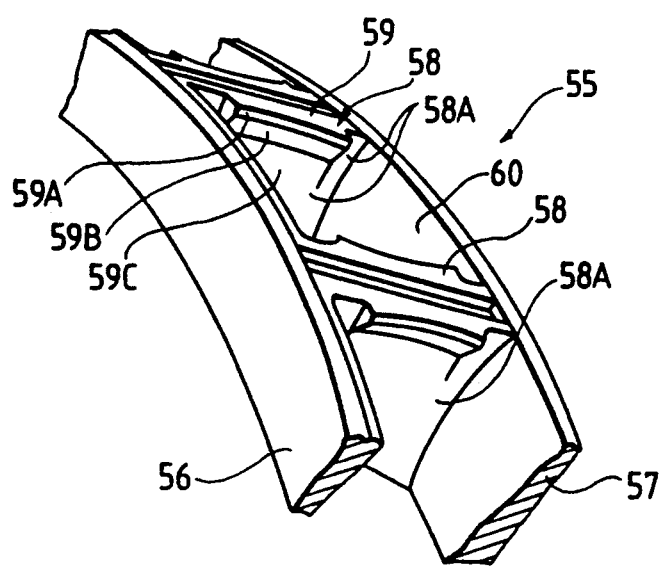
FIG. 5 is a fragmentary perspective view of a retainer for the spherical roller bearing shown in FIG. 4

As shown in FIG. 3 that is a fragmentary enlarged cross-sectional view of the retainer bar 8 taken along line N—N in FIG. 2, the retainer bar 8 is composed of an inner portion 8A on the inner race 1 side and an outer portion 8B on the outer race 2 side. Specifically, the inner portion 8A is located on the inner race side relative to a second phantom plane Y extending through a center P of each spherical roller at a right angle relative to a first phantom plane X extending through a center axis of the inner race 1 and a center P of each spherical roller 3, whereas the outer portion 8B is located on the outer race 2 side relative to the second phantom plane Y.

The inner portion 8A is contoured with a three-dimensional curved surface 108A that is a part of spherical surface extending along the spherical roller 3.

With such configuration of the inner portion 8A with the three-dimensional curved surface 108A as mentioned above, lubricant is reliably retained in the pocket 20, and moreover, the strength of each retainer bar 8 is improved.

As shown in FIG. 1 and FIG. 3, a central part 100 of the outer portion 8B as seen in the axial direction is composed of a first surface 100A, a second surface 100B and a third surface 100C. The first surface 100A merges into the three-dimensional curved surface 108A of the inner portion 108A. In addition, the first surface 100A extends along the spherical surface coinciding with the three-dimensional curved surface 108A of the inner portion 8A. In other words, the first surface 100A is formed by an arched surface having a radius R of curvature while it is defined by a part of the cylindrical surface extending in parallel with the first phantom plane X (see FIG. 2). Thus, the center axis of the cylindrical surface extends at a right angle relative to the second phantom plane Y. The second surface 100B merges into the first surface 100A and tilts toward the spherical roller 3 side. Specifically, the second surface 100B extends in parallel with a line segment which extends from a first intersection A where the second phantom plane Y intersects the peripheral surface of the spherical roller 3 to a second intersection B where an extension from the outer peripheral surface of the retainer 5 intersects the peripheral surface of the spherical roller 3. Thus, as the spherical roller 3 rolls, it comes in point contact with the second surface 100B.

Next, the third surface 100C merges into the second surface 100B and extends in parallel with the phantom plane X. In other words, the third surface 100C extends at a right angle relative to the second phantom plane Y.

As shown in FIG. 1, a projection 9 facing the pocket 20 is formed for the central part 100 of the retainer bar 8 as seen in the axial direction with the second surface 100B and the third surface 100C located opposite thereto.

In addition, as shown in FIG. 1, side surfaces 200 at the opposite ends of the outer portion 8B of the retainer bar 8 exclusive of the central part of the same as seen in the axial direction are formed by a part of the cylindrical surface defining the first surface 100A.

With such construction, each side surface 200 facing the pocket 20 is defined by the first surface 100A coinciding with the cylindrical surface located opposite to the spherical roller 3, the second surface 100B and the third surface 100C. In contrast with the conventional spherical roller wherein the projection on the outer diameter side of the retainer bar includes a curved surface extending around each spherical roller, the first surface 100A coinciding with the cylindrical surface of the central part 100 of the retainer bar 8, the second surface 100B and the third surface 100C are located opposite to the spherical roller 3. Consequently, as shown in FIG. 3, a wedge-shaped gap S is formed between the third surface 100C and the spherical roller 3, causing lubricant to easily penetrate through the wedge-shaped gap S to thereby form a lubricant film between the retainer 5 and the spherical surface 3. Since the central part 100 of the retainer bar 8 includes the first, second and third surfaces 100A, 100B and 100C each of which does not coincide with a spherical surface, a molding die for molding retainers 5 of a synthetic resin can easily be fabricated, and moreover, a molded product of retainer can easily be removed from the molding die after completion of each molding operation.

The second surface 100B tilts toward the spherical roller 3 side in the above-described manner. Thus, as the spherical roller 3 rolls, the second surface 100B comes in point contact with the spherical roller 3, resulting in disengagement of the spherical roller 3 from the retainer 5 being reliably prevented.

In addition, the side surfaces 200 at the opposite ends of the outer portion 8B of the retainer bar 8 as seen in the axial direction are defined by a part of the cylindrical surface of which center axis extends in the radial direction. Thus, the gap between the side surfaces 200 and the spherical roller 3 is increasingly widened in the radial direction, whereby the spherical roller 3 is not completely closed with the side surfaces 200. With this construction, in contrast with the conventional spherical roller bearing wherein each side surface extending from the end part on the inner race side to the end part on the outer race side is defined by a three-dimensional curved surface coinciding with the spherical surface of each spherical roller, lubricant easily penetrates through the gap between each side surface 200 and the spherical roller 3, causing a lubricant film to be easily formed between the spherical roller 3 and each retainer bar 8. Further, since each side surface 200 of the retainer bar 8 is defined by a part of the cylindrical surface, a molding die for molding retainers of a synthetic resin can easily be fabricated, and moreover, a molded product of retainer can easily be removed from the molding die after completion of each molding operation.

While the present invention has been described above merely with respect to a single preferred embodiment thereof, it should of course be understood that the present invention should not be limited only to this embodiment but various change or modification may be made without departure from the scope of the present invention as defined by the appended claims. For example, the present invention may equally be applied to a single row spherical roller bearing without any modification from the construction as mentioned above.

What is claimed is:

1. A double-row spherical roller bearing comprising:
   an inner race;
   an outer race;
   two retainers each molded of a synthetic resin, each of said retainers being located between said inner race and said outer race and integrally molded such that an annular portion on the large diameter side and an annular portion on the small diameter side are integrally jointed to each other with a plurality of retainer bars bridged therebetween so as to form a plurality of pockets each defined by said annular portion on the large diameter side, said annular portion on the small diameter side and adjacent retainer bars;
   each of said retainer bars for said retainers comprising an inner portion located on the inner race side relative to a second phantom plane extending through a center of each spherical roller at a right angle relative to a first phantom plane extending through a center axis Of said spherical roller bearing and the center of each spherical roller and an outer portion located on the outer race side relative to said second phantom plane;
   the side surface of said inner portion facing the corresponding pocket being defined by a part of the spherical surface extending around said spherical roller,
   the central part of the side surface of said outer portion facing the corresponding pocket as seen in the axial direction being defined by a first surface merging into the spherical surface of said inner portion, a second surface extending from said first surface on the outer race side and a third surface extending from said second surface on the outer race side, said first surface being formed by a part of the cylindrical surface extending around the spherical surface on the inner portion side while extending in the axial direction, the center axis of the cylindrical surface extending in parallel with said first phantom plane, said second surface tilting toward the spherical roller side and coming in point contact with the spherical roller as it rolls, and said third plane extending in parallel with said first phantom surface,
   the side surfaces facing the corresponding pocket at the opposite ends of said outer portion exclusive of the central part of said spherical roller bearing as seen in the axial direction being defined by a part of the cylindrical surface defining said first surface, and
   double-rows of spherical rollers rotatably received in said pockets and arranged one after another in the equally spaced relationship in the circumferential direction.

2. The double-row spherical roller bearing according to claim 1, wherein said first surface is formed by an arched surface having a predetermined radius of curvature while it is defined by a part of the cylindrical surface extending in parallel with said first phantom plane.

3. The double-row spherical roller bearing according to claim 1, wherein said second surface extends in parallel with a line segment which extends from a first intersection where said second phantom plane intersects the peripheral surface of said spherical roller to a second intersection where an extension from the outer peripheral surface of said retainer intersects the peripheral surface of said spherical roller.

4. The double-row spherical roller bearing according to claim 1, wherein a wedge-shaped gap is formed between said third surface and said spherical roller on the outer portion side so as to allow lubricant to easily penetrate therethrough.

5. The double-row spherical roller bearing according to claim 1, wherein when said spherical roller rolls, said spherical roller is brought in point contact with said second surface so as to reliably prevent said spherical roller from disengaging from the corresponding pocket.

6. The double-row spherical roller bearing according to claim 1, wherein the gap between the side surfaces and the spherical roller on the outer portion side is increasingly widened in the radial direction so as to allow lubricant to easily penetrate therethrough.

* * * * *